United States Patent [19]

Ellis et al.

[11] 3,802,536

[45] Apr. 9, 1974

[54] MUFFLERS FOR MAGNETIC TAPE DRIVE SYSTEM

[75] Inventors: Lyle A. Ellis, Denver; Dennis R. Olmsted, Westminster; Sandford Platter, Boulder; William D. Schrupp, Longmont, all of Colo.

[73] Assignee: Storage Technology Corporation, Boulder, Colo.

[22] Filed: Oct. 27, 1972

[21] Appl. No.: 301,374

[52] U.S. Cl. ............. 181/33 K, 181/36 R, 242/182, 274/4 D

[51] Int. Cl. ............................................ E04b 1/84

[58] Field of Search ......... 242/182; 181/33 K, 36 R, 181/36 D, DIG. 1; 274/4 D; 179/100.2 PM

[56] References Cited

UNITED STATES PATENTS

| | | | |
|---|---|---|---|
| 3,688,866 | 9/1972 | Kong | 181/33 K |
| 3,196,975 | 7/1965 | Voelker | 181/DIG. 1 UX |
| 3,087,578 | 4/1963 | Reed et al. | 181/33 K UX |
| 3,195,530 | 7/1965 | Heidner | 181/33 K UX |
| 3,513,938 | 5/1970 | Buehner | 181/33 K UX |
| 3,703,997 | 11/1972 | Epina et al. | 242/182 |

*Primary Examiner*—Stephen J. Tomsky
*Assistant Examiner*—John F. Gonzales
*Attorney, Agent, or Firm*—Woodstock, Washburn, Kurtz & Mackiewicz

[57] ABSTRACT

Broad band frequency sound mufflers comprising a high sound absorption material communicate with the vacuum buffer zone of a computer magnetic tape drive unit. One muffler is located at each junction between the small tapered chambers and the large vertical chamber of the vacuum buffer zones. In one embodiment, the mufflers are moved into the vacuum buffer zones after tape loading and moved out of the vacuum buffer zones for tape unloading by an electrical or pneumatic actuating mechanism responsive to tape loading and tape unloading signals. During tape loading and unloading, the mufflers are retracted into the door or the rear plate forming the vacuum buffer zone. In another embodiment, the mufflers remain in stationary positions in the door or the rear plate with communication to the buffer zone through a plurality of small, closely spaced openings.

13 Claims, 5 Drawing Figures

MUFFLERS FOR MAGNETIC TAPE DRIVE SYSTEM

BACKGROUND OF THE INVENTION

1. Field of the Invention

This invention relates to magnetic tape drives, and more particularly, to magnetic tape drives having vacuum buffer zones.

High-performance digital magnetic tape drive units are extensively used in digital computer systems. Examples of high-performance magnetic tape drive units are the STC 2470 manufactured by the assignee of this invention and the IBM 2420 Model 5 described in the IBM Systems Library Bulletin, File S/360-05. Units such as these include a file reel, a machine reel and a capstan for driving the magnetic tape past the heads and between the file reel and the machine reel.

High-performance tape drives require tape buffer zones to allow for the difference in acceleration rates between capstan motors and the reel motors. A capstan motor can accelerate the tape from a stand-still to 200 inches/second in less than two milliseconds while reel motors may take up to 20 milliseconds to accelerate from a stand-still to about 200 inches/second. A slack in tape must therefore be provided between the capstan motor and the reel motor to couple the inertia of the magnetic tape as the reel motors come up to speed. Buffer zones are therefore provided which comprise a large evacuated vertical chamber and a small evacuated tapered chamber receiving slack tape on each side of the capstan.

At the end of each vertical chamber and each tapered chamber is a vacuum source which pulls the tape into the chambers. When the capstan moves the tape, the loops of tape in the ends of the chambers move outward or upward as the case may be away from the vacuum sources. This tape motion causes a pumping of air which in turn causes acoustical noise of a large amplitude over a frequency range of 125 to 4,000 Hz. This noise in a computer room can become annoying to operators and may even result in a hearing loss with long periods of exposure to the noise.

2. The Prior Art

The conventional, high-performance tape drive for computers utilizes a door comprising a single glass plate which forms the outer wall of the vacuum buffer zone when the door is closed. A single plate of glass is not particularly effective in reducing the noise level in a computer room to acceptable levels for the operators.

Some previous attempts to reduce this noise level have involved the use of an additional door comprising a glass plate overlying the entire front of the tape drive unit. The result was a dead air space between the original glass plate and the glass plate of the additional door, which dead air space did not communicate with the vacuum buffer zones. It has been found that such a construction has not been particularly effective in reducing the noise levels around magnetic tape drive units.

In U.S. Pat. No. 3,703,997, which is assigned to the assignee of this invention, a magnetic tape drive unit is disclosed wherein a muffler communicating with the vacuum buffer zones is provided. The muffler is formed by the space between two glass panels in the door with communication provided by one opening in the inner glass panel at each junction between the tapered and the vertical chambers of the buffer zones. A muffler of this type provides a single frequency resonator absorber but that does not reduce the amplitude of the other noise frequencies generated in the vacuum buffer zones.

SUMMARY OF THE INVENTION

It is one object of this invention to reduce the noise level associated with a high-performance tape drive unit over a substantial portion of the noise frequency range.

It is another object of this invention to reduce the aforesaid noise level without impeding the tape loading and unloading operations of a high-performance tape drive unit.

In accordance with these objects, the preferred embodiment of the invention comprises a magnetic tape drive system including a file reel and a machine reel, a magnetic head mounted intermediate the file reel and the machine reel and a capstan for driving magnetic tape in both directions past the head. A vacuum buffer zone is located on each side of the magnetic head for receiving tape, and a muffler comprising a broad band frequency absorption material communicates with each side of the buffer zone reducing acoustical noise generated within the buffer zone.

In one preferred embodiment of the invention, the muffler is moved into and out of the vacuum buffer zone by an electrical or pneumatic actuating means so as to permit tape loading and unloading. The muffler comprises a pair of muffler structures of circular cross-section which move into and out of a pair of vacuum buffer zones at the two junctions between the tapered chambers and the vertical chambers. The muffler may be retracted into the door at one side of the buffer zone or the rear plate at the other side of the buffer zone.

In another embodiment of the invention, a muffler is located in a stationary position at the door side or the rear side of the buffer zones and communicate with each of the buffer zones through a plurality of openings. The muffler structure itself comprises a layer of low noise reflection material located between the openings and the broad band frequency sound absorption material and a layer of vibration damping material separating the broad band frequency sound absorption material from its cover.

DETAILED DESCRIPTION OF PREFERRED EMBODIMENTS

Figure 1:
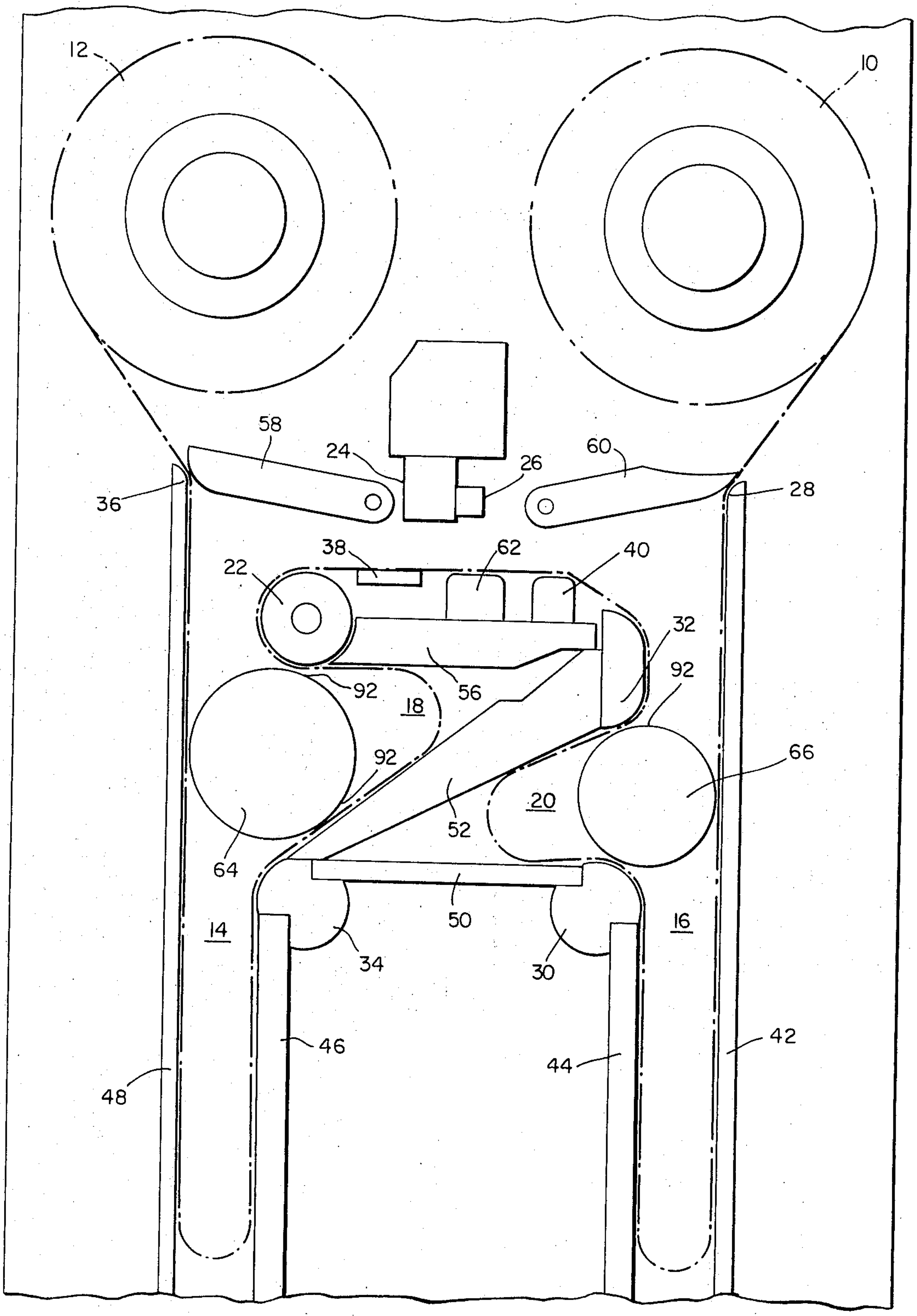
FIG. 1 is a front view of a tape drive unit showing the location of mufflers in one embodiment of the invention.

As shown in FIG. 1, a magnetic tape recording and reproducing system includes a file reel 10 and a machine reel 12. Vacuum buffer zones including vertical chambers 14 and 16 and tapered, horizontal chambers 18 and 20 are located on substantially opposite sides of a capstan 22 which drives the tape past a magnetic read/write head 24 and an erase head 26. The path of the tape between the file reel 10 and the machine reel 12 is guided and determined by air bearings 28, 30, 32, 34 and 36 as well as guides 38 and 40. The tape is further guided in this path by vertical chamber-forming members 42, 44, 46 and 48 as well as tapered chamber-forming members 50, 52 and 56. Threading channels 58 and 60 are also provided above the guides 38 and 40 and a tape sensor 62 is located above the guide member 56 and at one side of the guide member 40.

Figures 2, 3:
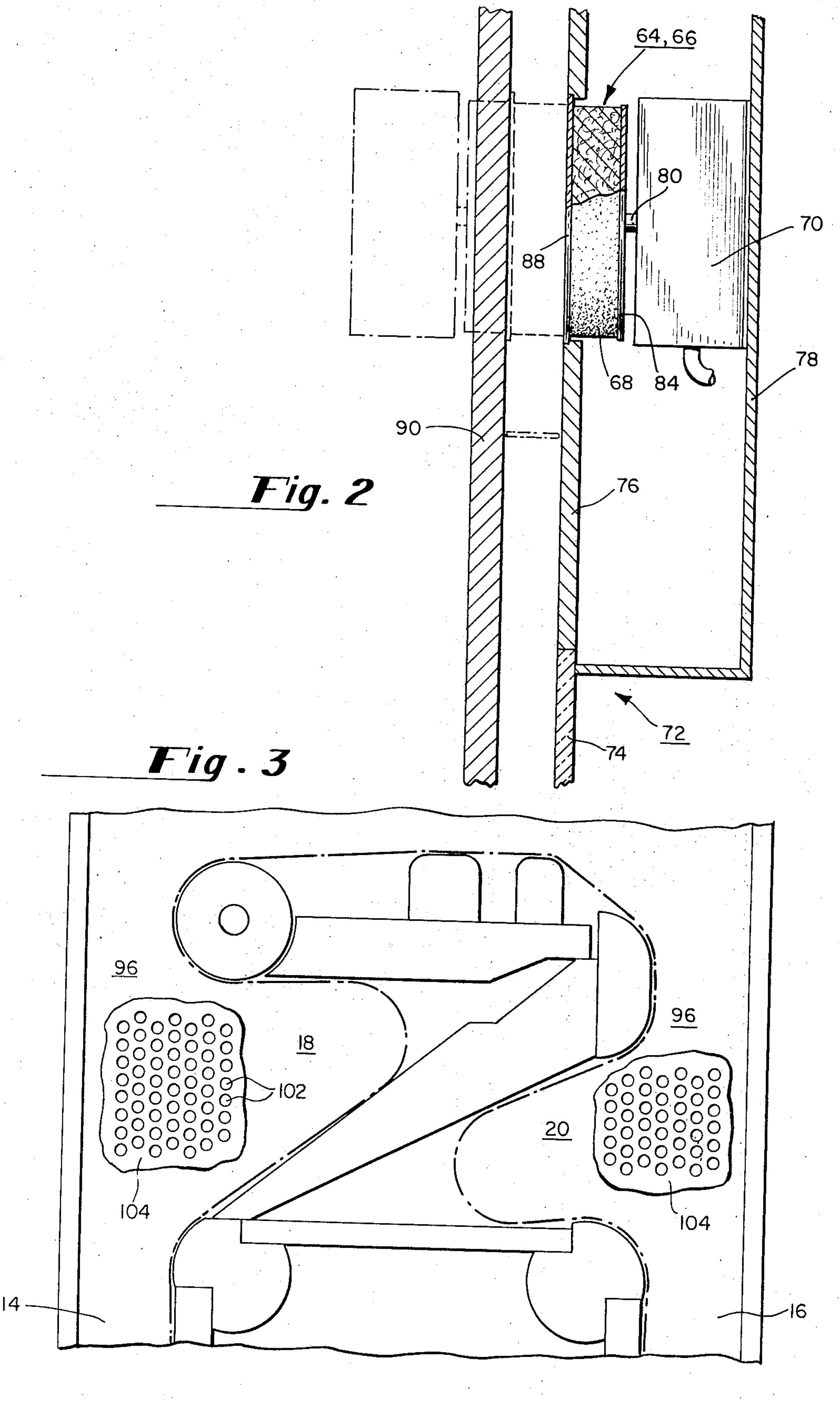
FIG. 2 is a sectional view of a tape drive unit showing the embodiment of FIG. 1.
FIG. 3 is a front view of a tape drive unit showing the location of mufflers in another embodiment of the invention.

In this embodiment of the invention as illustrated in FIGS. 1 and 2, a pair of noise absorption mufflers 64 and 66 are located at the respective junctions of vertical chambers 14 and 16 and the tapered chambers 18 and 20. In accordance with one important object of the invention, the mufflers 64 and 66 comprise a material 68 which is characterized by a high noise absorption coefficient, i.e., at least 0.4 at 100 Hz and reaching 0.95 at 1,000 Hz and remaining at 0.95 to 5,000 Hz so as to reduce the noise level over a substantial portion of the noise frequency range.

In accordance with another object of the invention, mufflers 64 and 66 are moved into and out of the vacuum buffer zones by an actuating mechanism 70 to permit tape loading and unloading. The actuating mechanism 70 which may comprise a solenoid or a pneumatic actuator with a spring return to the normal or unused position shown in full in FIG. 2 is responsive to a "tape loaded" signal to move the mufflers 64 and 66 into the buffer zones to the position shown in broken lines. The actuating mechanism 70 is also responsive to a "tape ready to unload" signal to move the mufflers 64 and 66 out of the buffer zones as shown in full before unloading.

In moving the mufflers 64 and 66 out of the buffer zones, the time constant can be relatively slow, e.g., 0.05 to 0.10 seconds. However, in moving the mufflers 64 and 66 out of the vacuum buffer zones during tape unloading, the time constant must not exceed 0.005 seconds so as to assure that the mufflers 64 and 66 are out of the way of the tape and thereby prevent damage to the tape during unloading. Also, the muffler must move rapidly out of the buffer zones if the vacuum in the buffer zones is lost for any reason so as to assure no tape damage. Such a signal as well as the previously mentioned signals are generated by the STC 2470 as well as the IBM 2420 Model 5.

As shown in FIG. 2, the mufflers 64 and 66 are mounted on a door 72 above a glass plate 74 and between a metal plate 76 and a decorative door front panel 78. The actuating mechanism 70 is secured to the panel 78 with its plunger 80 attached to a plate 84 which is coextensive with one side of the sound absorption material 68. The other side of the sound absorption material 68 is covered by a wear plate 88 which abuts a rear plate 90 of the buffer zone.

With reference to FIG. 1, it may be seen that the mufflers 64 and 66 substantially fill the junction between columns 14 and 16 and the tapered chambers 18 and 20. In order to maximize the effects of the mufflers, the clearance between the edge 92 of the mufflers 64 and 66 must be spaced no closer than 0.060 inches and no further than 0.15 inches from the adjacent walls of the buffer zones. Also, the plate 88 shown in FIG. 2 should be flush with the panel 76 or recessed with respect to the panel 76 when the mufflers 64 and 66 are in the out position as shown in full in FIG. 2.

Although the mufflers 64 and 66 may comprise various materials, it has been found that open cell, high density urethane is particularly effective for the material 68 due to its high absorption coefficient of 0.4 to 0.95 in the range of 100 to 5,000 Hz. High density open cell foam urethane is best for this purpose. The plate 88 should comprise a metal or hard plastic so as to resist wear or bending and prevent tape contamination. Preferably, plate 88 is no more than 0.030 inches thick.

It has also been found that the length of the mufflers 64 and 66 along the axis extending upwardly from the vertical chambers 14 and 16 and the length of the mufflers 64 and 66 along the axis extending outwardly from the tapered chambers 18 and 20 should be at least 2.0 inches. To meet these requirements, a circular cross-section for the mufflers 64 and 66 as shown in FIG. 1 is particularly well suited.

In the embodiment of FIG. 2, the mufflers 64 and 66 are mounted on the door 72. It is however possible to mount the mufflers 64 and 66 on the rear plate 90 as shown with dotted lines so as to extend the mufflers from and retract the mufflers into the rear plate 90 in response to the various control signals mentioned previously.

Figure 4:
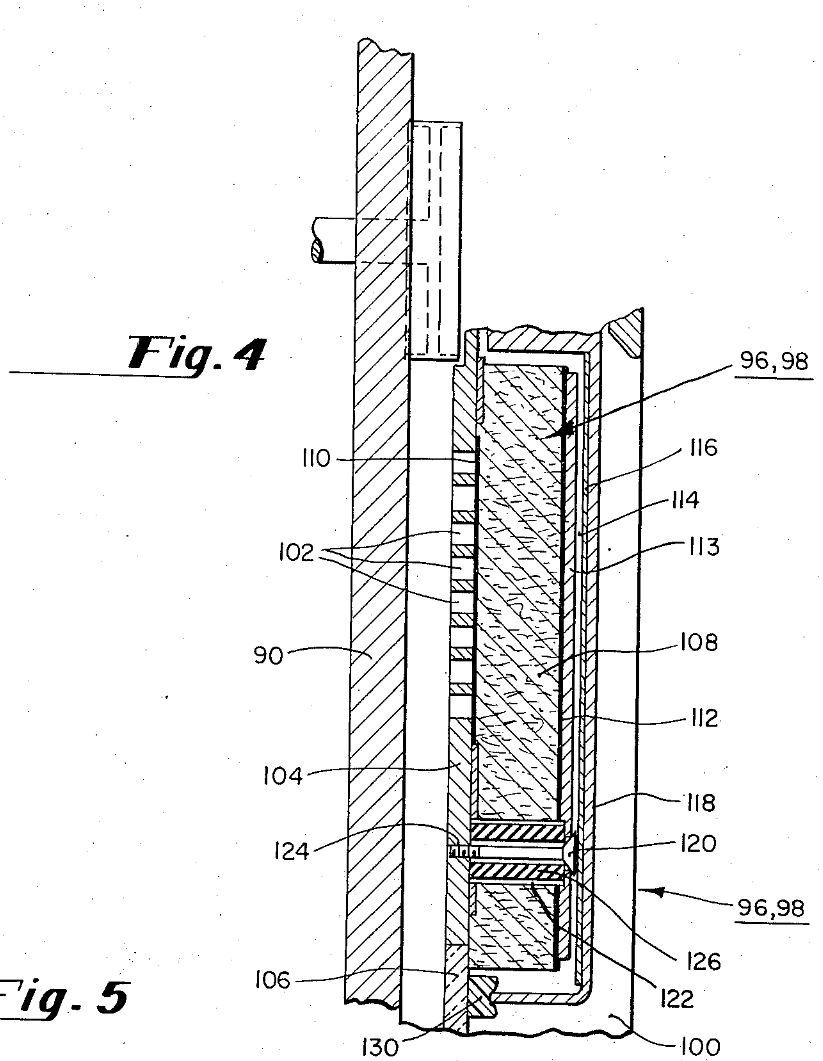
FIG. 4 is a sectional view of the tape drive unit shown in FIG. 3.
Figure 5:
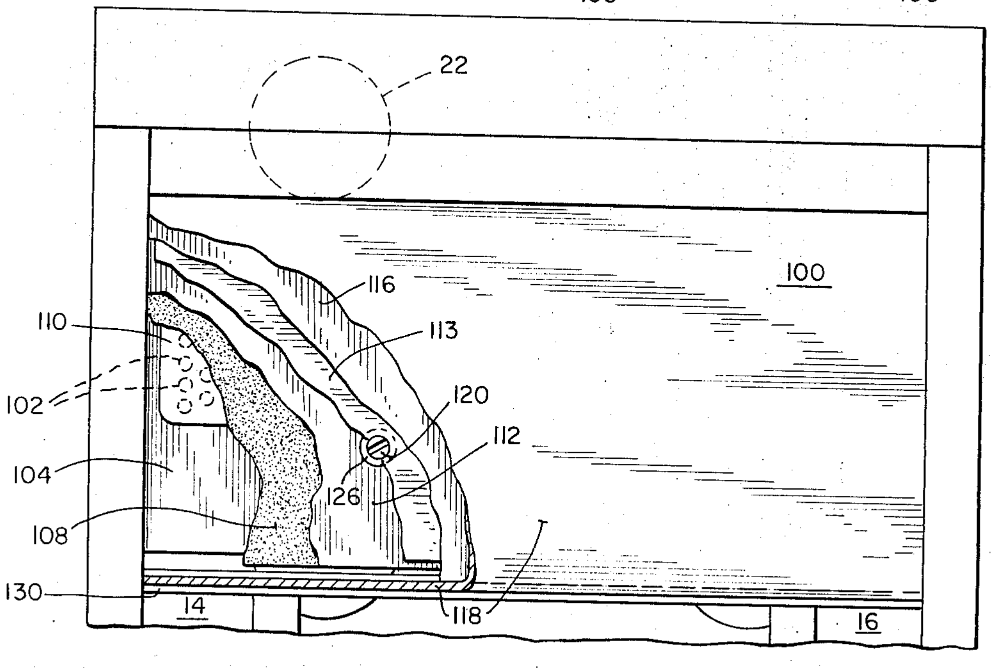
FIG. 5 is a front, partially sectioned view of the embodiment shown in FIG. 4.

In the embodiment of the invention shown in FIGS. 3–5 the mufflers 96 and 98 are mounted in a stationary position in the door 100 with the connunication to the junction of the vertical chambers 14 and 16 and the tapered chambers 18 and 20 through a plurality of closely spaced openings 102 extending through a metal plate 104 located above a glass panel 106 of the door 100. By providing the mufflers 96 and 98 with a material 108 characterized by a high-sound absorption coefficient over a wide noise frequency range, a substantial reduction in the noise level associated with the tape drive system is achieved for the following reason.

The noise at the junctions between the vertical columns 14 and 16 and the tapered chambers 18 and 20 is in a diffuse field. Of course, the noise seeks a path of travel representing the lowest resistance and such a path is provided by the openings 102 and the high-sound absorption material 108 located behind these openings. Since the area of the low resistance path as represented by the total area of the openings 102 and the area of the opposite wall provided by the rear plate 90 which serves to reflect noise to the openings 102 is much larger than the total area into and out of the chambers 14 and 16 and the chambers 18 and 20, the majority of the tape-motion-induced noise is absorbed by the material 108. Of course, the mufflers 96 and 98 cannot interfere with the tape loading and unloading operation since they do not extend into the buffer zones.

In order to maximize the effectiveness of the mufflers 96 and 98 as shown in FIGS. 4 and 5, a low noise reflection material 110 is provided between the openings 102 and the buffer zone side of the sound absorbing material 108. The other side of the sound absorbing material 108 is covered with a lead backing 112 and a steel retaining plate 113 which are separated by an air gap 114 from a vibration damping material 116 which extends along the interior of a muffler cover 118. The mufflers 96 and 98 are supported within the cover 118 in a manner so as to maintain the air gap 114 by a plurality of screws 120 which extend into openings 122 in the sound absorption material 108 and into holes 124. Vibration damping material 126 fills the holes 122 around the screws 120. The cover 118 is secured to the top of the door 100 and the glass 106 at a seal 130.

The openings 102 must be rather small, e.g., 0.25 inches in diameter in order to allow tape loading without substantial leakage past the tape. Also, the holes are critically located at the junction between the columns 14 and 16 and the chambers 18 and 20 so as to extend into the openings of the tapered chambers 18 and 20. The total area of the holes should be at least 2 square inches with the depth of the holes 0.25 inches or less. The sound absorption material 108 is 1.0 inches thick and the lead layer 112 is 0.02 inches thick. The air gap 114 is 0.10 inches thick. Note as shown in FIGS. 4 and 5 that the sound absorption material overlaps the holes 102 a distance substantially greater than the maximum width or diameter of the openings.

As shown in FIGS. 4 and 5, the mufflers 96 and 98 are mounted in the door 100. However, the muffler may also be mounted on the rear plate 90 where the openings are located in the position indicated by FIG. 3.

The mufflers described in the foregoing specification are very effective to reduce the noise levels associated with tape drive units. Using an STC 250 ips tape drive as a reference, which tape drive is manufactured by the assignee of this invention, the actuated muffler of FIGS. 1 and 2 reduces the tape-motion-induced noise over the noise frequency range (250–4,000 Hz.) by about 19 DB over an ordinary safety glass door and by about 12 DB over a double safety glass door as described in the aforesaid application Ser. No. 156,618. The stationary muffler has about 5 DB less noise reduction than the actuated muffler.

The appended claims are intended to cover the foregoing embodiments as well as any and all other embodiments which fall within the true spirit and scope of the invention.

What is claimed is:

1. The magnetic tape drive system comprising:
a file reel and a machine reel;
a magnetic head mounted intermediate said file reel and said machine reel;
a capstan for driving magnetic tape in both directions past said head and between said reels;
at least one vacuum buffer zone for receiving a tape loop; and
muffler means located at one side of said buffer zone comprising a broad band sound absorption material in communication with said buffer zone through a plurality of openings in said one side, said sound absorption material overlapping each of said openings on all sides by a distance substantially greater than a maximum width of the openings.

2. A magnetic tape drive system comprising:
a file reel and a machine reel;
a magnetic head mounted intermediate said file reel and said machine reel;
a capstan for driving magnetic tape in both directions past said head and between said file reel and machine reel;
a pair of vacuum buffer zones for receiving said tape, each of said zones comprising a tapered chamber and a vertical chamber;
plate means mounted at the rear of each of said buffer zones;
door means mounted at the front of each of said buffer zones;
muffler means communicating with each of said buffer zones at the junction between said tapered chamber and said vertical chamber for reducing acoustical noise generated by said buffer zones, said muffler means comprising a broad band frequency sound absorption material; and
actuating means for moving said muffler means into each of said vacuum buffer zones after tape loading and out of each of said vacuum buffer zones before tape unloading, said muffler means and said actuating means being mounted on said plate means so as to extend said muffler means from and retract said muffler means into said plate means.

3. A magnetic tape drive system comprising:
a file reel and a machine reel;
a magnetic head mounted intermediate said file reel and said machine reel;
a capstan for driving magnetic tape in both directions past said head and between said file reel and machine reel;
a pair of vacuum buffer zones for receiving said tape, each of said zones comprising a tapered chamber and a vertical chamber;
plate means mounted at the rear of each of said buffer zones;
door means mounted at the front of each of said buffer zones;
muffler means communicating with each of said buffer zones at the junction between said tapered chamber and said vertical chamber for reducing acoustical noise generated by said buffer zones, said muffler means comprising a broad band frequency sound absorption material; and
actuating means for moving said muffler means into each of said vacuum buffer zones after tape loading and out of each of said vacuum buffer zones before tape unloading, said muffler means and said actuating means being mounted on said door means so as to extend said muffler means from and retract said muffler means into said door means.

4. A magnetic tape drive system comprising:
a file reel and a machine reel;
a magnetic head mounted intermediate said file reel and said machine reel;
a capstan for driving magnetic tape in both directions past said head and between said file reel and machine reel;
a pair of vacuum buffer zones for receiving said tape, each of said zones comprising a tapered chamber and a vertical chamber;
muffler means communicating with each of said buffer zones at the junction between said tapered chamber and said vertical chamber for reducing acoustical noise generated by said buffer zones, said muffler means comprising a broad band frequency sound absorption material; and
actuating means for moving said muffler means into each of said vacuum buffer zones after tape loading and out of each of said buffer zones before tape unloading in response to control signals generated by said tape drive unit.

5. The magnetic tape drive system of claim 4 wherein said muffler means is moved in response to a signal representing a loss of vacuum in said vacuum buffer zones.

6. The magnetic tape drive system of claim 4 wherein said sound absorption material has a sound absorption coefficient of at least 0.4 at 100 Hz., 0.95 at 1,000 Hz and 0.95 at 5,000 Hz in the frequency range of 100 to 5,000 hertz.

7. The magnetic tape drive system of claim 4 wherein the area of communication with each of said buffer zones extends across a substantial portion of the opening to said tapered chamber at said junction.

8. The magnetic tape drive system of claim 7 wherein the area of communication with each of said buffer zones comprises at least two square inches.

9. A magnetic tape drive system comprising:

a file reel and a machine reel;

a magnetic head mounted intermediate said file reel and said machine reel;

a capstan for driving magnetic tape in both directions past said head and between said file reel and machine reel;

a pair of vacuum buffer zones for receiving said tape, each of said zones comprising a tapered chamber and a vertical chamber; and muffler means mounted at one side of said buffer zones and communicating with each of said buffer zones through a plurality of openings in said one side of said buffer zones located at the junction between said tapered chamber and said vertical chamber for reducing acoustical noise generated by said buffer zones, said muffler means comprising a broad band frequency sound absorption material and a low noise reflection material located between said openings and said sound absorption material.

10. The magnetic tape drive system of claim 9 wherein said muffler means includes a wear-resistant exterior surface exposed to each of said vacuum buffer zones, said sound absorption material being located behind said wear-resistant surface.

11. A magnetic tape drive system comprising:

a file reel and a machine reel;

a magnetic head mounted intermediate said file reel and said machine reel;

a capstan for driving magnetic tape in both directions past said head and between said file reel and machine reel;

a pair of vacuum buffer zones for receiving said tape, each of said zones comprising a tapered chamber and a vertical chamber; and muffler means mounted at one side of said buffer zones and communicating with each of said buffer zones through a plurality of openings in said one side of said buffer zone located at the junction between said tapered chamber and said vertical chamber for reducing acoustical noise generated by said buffer zones, said muffler means comprising a broad band frequency sound absorption material and a vibration damping material spaced from said sound absorption material on the side opposite said openings.

12. A magnetic tape drive system comprising:

a file reel and a machine reel;

a magnetic head mounted intermediate said file reel and said machine reel;

a capstan for driving magnetic tape in both directions past said head and between said file reel and machine reel;

a pair of vacuum buffer zones for receiving said tape, each of said zones comprising a tapered chamber and a vertical chamber; and muffler means communicating with each of said buffer zones at the junction between said tapered chamber and said vertical chamber for reducing acoustical noise generated by said buffer zones, said muffler means comprising a broad band frequency sound absorption material and vibration damping material covering a portion of said sound absorption material.

13. A magnetic tape drive system comprising:

a file reel and a machine reel;

a magnetic head mounted intermediate said file reel and said machine reel;

a capstan for driving magnetic tape in both directions past said head and between said file reel and machine reel;

a pair of vacuum buffer zones for receiving said tape, each of said zones comprising a tapered chamber and a vertical chamber; and muffler means communicating with each of said buffer zones at the junction between said tapered chamber and said vertical chamber for reducing acoustical noise generated by said buffer zones, said muffler means comprising a broad band frequency sound absorption material and a low noise reflection material located between said buffer zone and said sound absorption material.

* * * * *